United States Patent
Chang

(10) Patent No.: US 8,078,240 B2
(45) Date of Patent: Dec. 13, 2011

(54) SLIDING-TYPE PORTABLE ELECTRONIC DEVCIE

(75) Inventor: Cheng-Lung Chang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 372 days.

(21) Appl. No.: 12/536,294

(22) Filed: Aug. 5, 2009

(65) Prior Publication Data
US 2010/0033069 A1   Feb. 11, 2010

(30) Foreign Application Priority Data
Aug. 11, 2008   (CN) .................. 2008 1 0303662

(51) Int. Cl.
*H04M 1/00* (2006.01)

(52) U.S. Cl. .................................................. 455/575.4
(58) Field of Classification Search .............. 455/575.4
See application file for complete search history.

(56) References Cited

U.S. PATENT DOCUMENTS
2011/0136555 A1*   6/2011   Ramies et al. .............. 455/575.8
* cited by examiner

*Primary Examiner* — Duc Nguyen
*Assistant Examiner* — Ankur Jain
(74) *Attorney, Agent, or Firm* — Altis Law Group, Inc.

(57) ABSTRACT

A sliding-type portable electronic device for opening bottle covers of bottles is provided, including a housing member and a cover member. The housing member defines a first latching recess. The cover member is slidably attached to the housing member, and defines a second latching recess facing the first latching recess. The second latching and the first latching recess enclose an adjustable latching space configured for latching the bottle covers during opening of the bottle covers.

12 Claims, 5 Drawing Sheets

SLIDING-TYPE PORTABLE ELECTRONIC DEVCIE

BACKGROUND

1. Technical Field

The present disclosure relates to sliding-type portable electronic device, and particularly to a sliding-type portable electronic device functioning as a bottle opener.

2. Description of Related Art

Nowadays, sliding-type portable electronic devices such as sliding-type mobile phones are widely used. The sliding-type mobile phone typically comprises a main body and a cover body slidably attached to the main body. Most persons have become accustomed to carrying their mobile phones with them wherever they go. However, mobile phones do not provide any additional functions other than the usual electronic ones.

Therefore, there is room for improvement within the art.

BRIEF DESCRIPTION OF THE DRAWING

Many aspects of the new sliding-type portable electronic device can be better understood with reference to the following drawings. The components in the drawings are not necessarily drawn to scale, the emphasis instead being placed upon clearly illustrating the principles of the new sliding-type portable electronic device. Moreover, in the drawings, like reference numerals designate corresponding parts throughout the several views.

DETAILED DESCRIPTION

Figure 1:
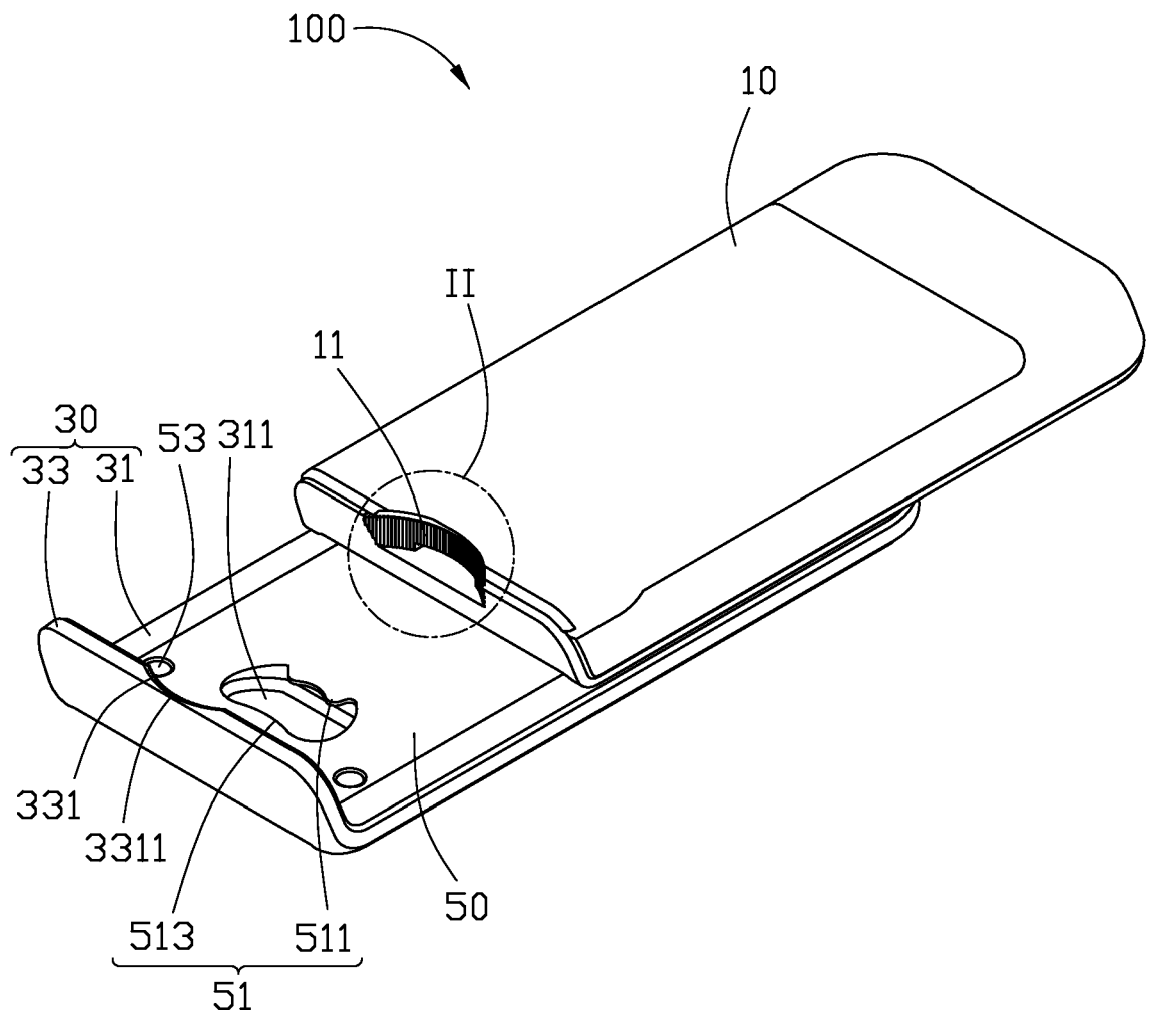
FIG. 1 is an isometric view of a sliding-type portable electronic device according to an exemplary embodiment, including a cover member.

FIG. 1 shows an exemplary sliding-type portable electronic device 100 including a housing member 10, a cover member 30, and a bottle opener member 50 for removing bottle caps. The cover member 30 can be slidably attached to the housing member 10. The cover member 30 can slide lengthwise over the housing member 10. The bottle opener member 50 is secured to the cover member 30.

Figure 2:
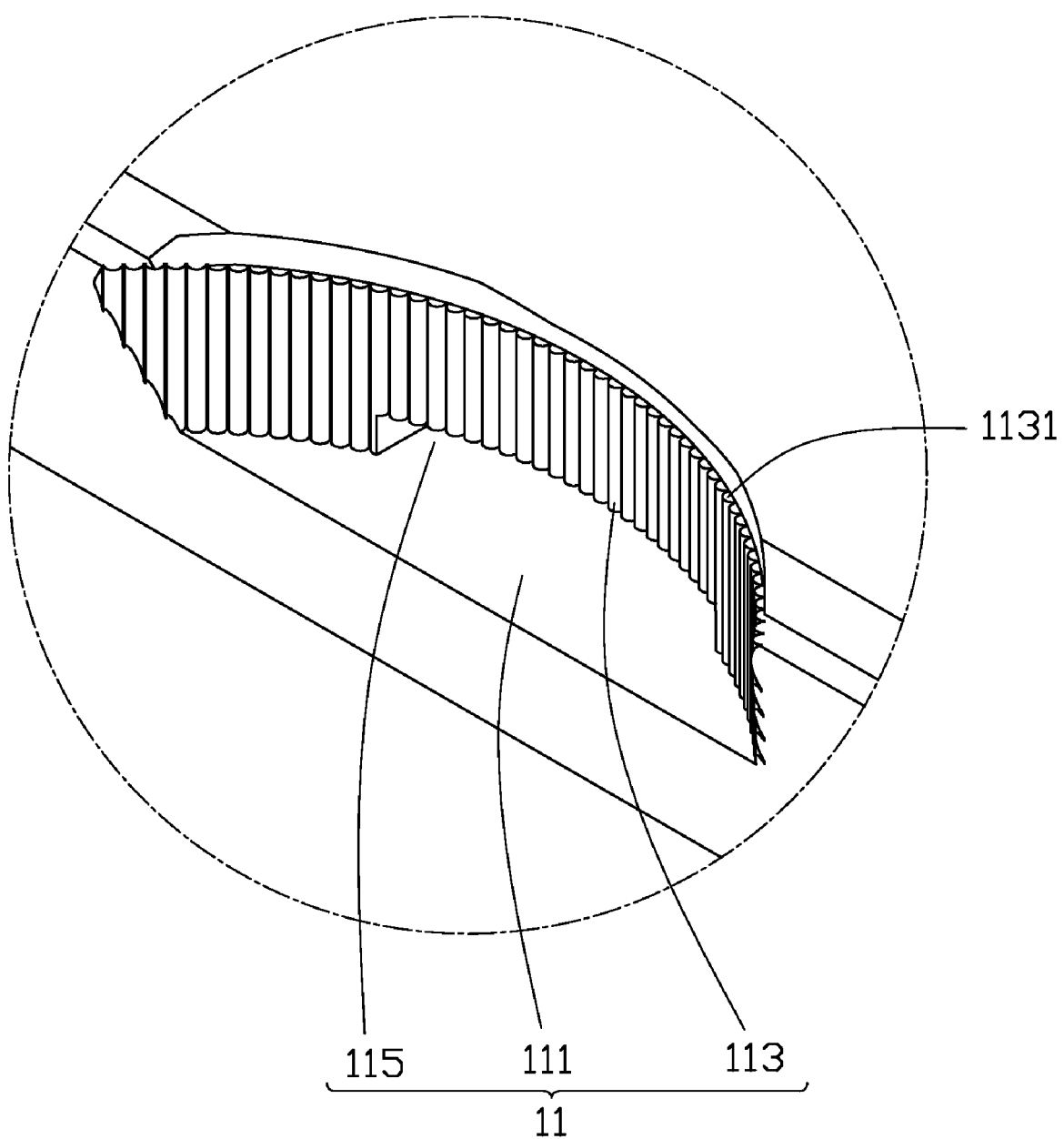
FIG. 2 is an enlarged view of section II illustrated in FIG. 1.

The cover member 30 comprises a base plate 31 and an extension plate 33 extending aslant from an end of the base plate 31. The housing member 10 defines a first latching recess 11 at an end facing the extension plate 33. As best shown in FIG. 2, the first latching recess 11 is formed by a planar bottom wall 111 and an arcuate sidewall 113 connected to the bottom wall 111. The sidewall 113 has a slot 115 defined at the center thereof extending into the housing member 10. The sidewall 113 comprises a plurality of evenly-arranged first protruding ribs 1131 substantially perpendicular to the bottom wall 111.

Referring back to FIG. 1, the base plate 31 defines a receiving cavity 311. The bottle opener member 50 is made of a strong and rigid material and defines a latching hole 51 corresponding to the receiving cavity 331 and a plurality of fixing holes 53 facilitating the fixing of the bottle opener member 50 to the base plate 31. The latching hole 51 aligns above the receiving cavity 331, and is enclosed by a wave-shaped first latching wall 511 and a second latching wall 513 connected to the first latching wall 511.

Figure 3:
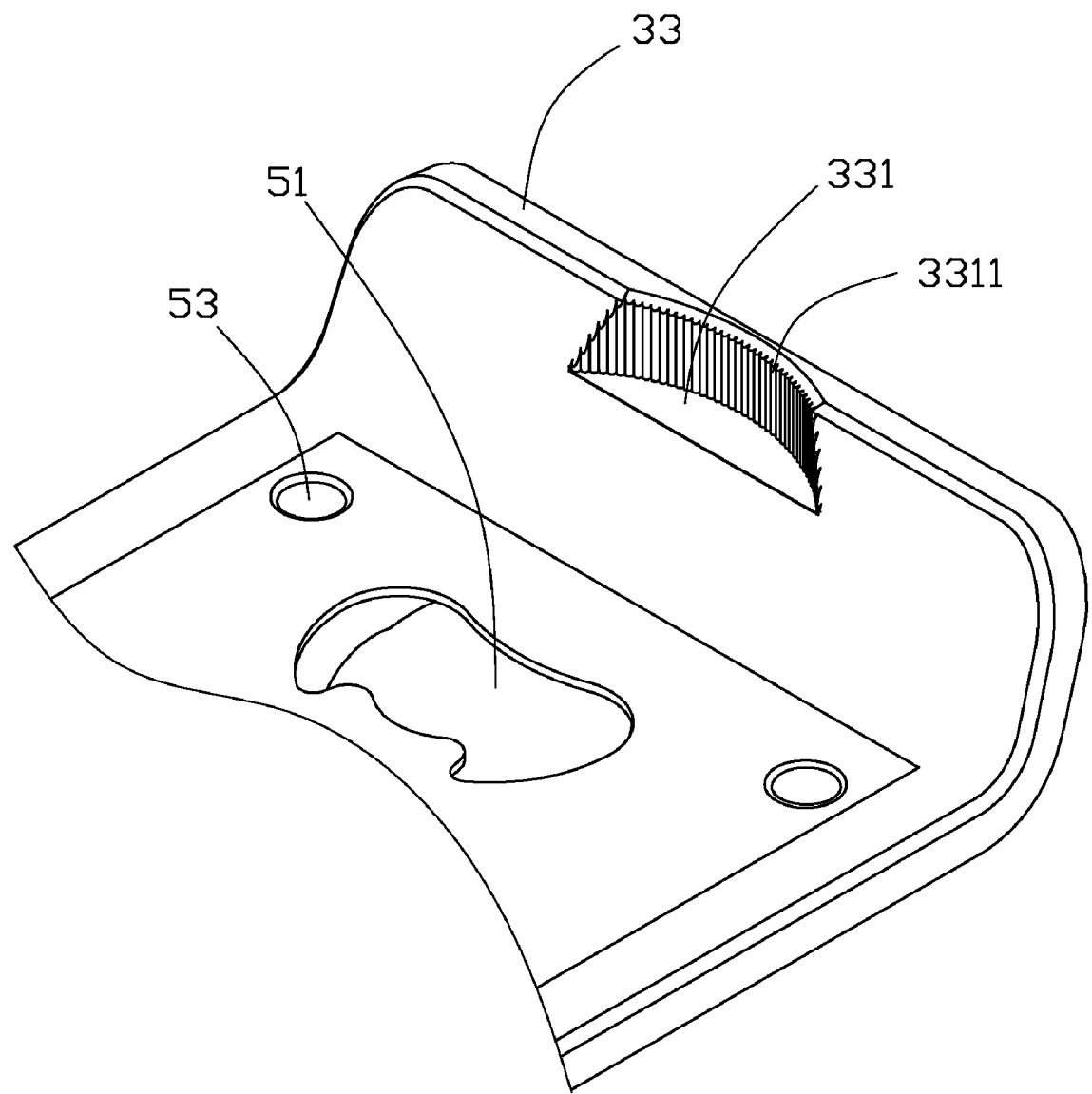
FIG. 3 is an enlarged partial view of the cover member shown in FIG. 1.

Referring further to FIG. 3, the base plate 31 defines a second latching recess 331 facing and aligned with the first latching recess 11. The second latching recess 331 has substantially the same structure as the first latching recess 11 in forming a plurality of second protruding ribs 3311.

Figure 4:
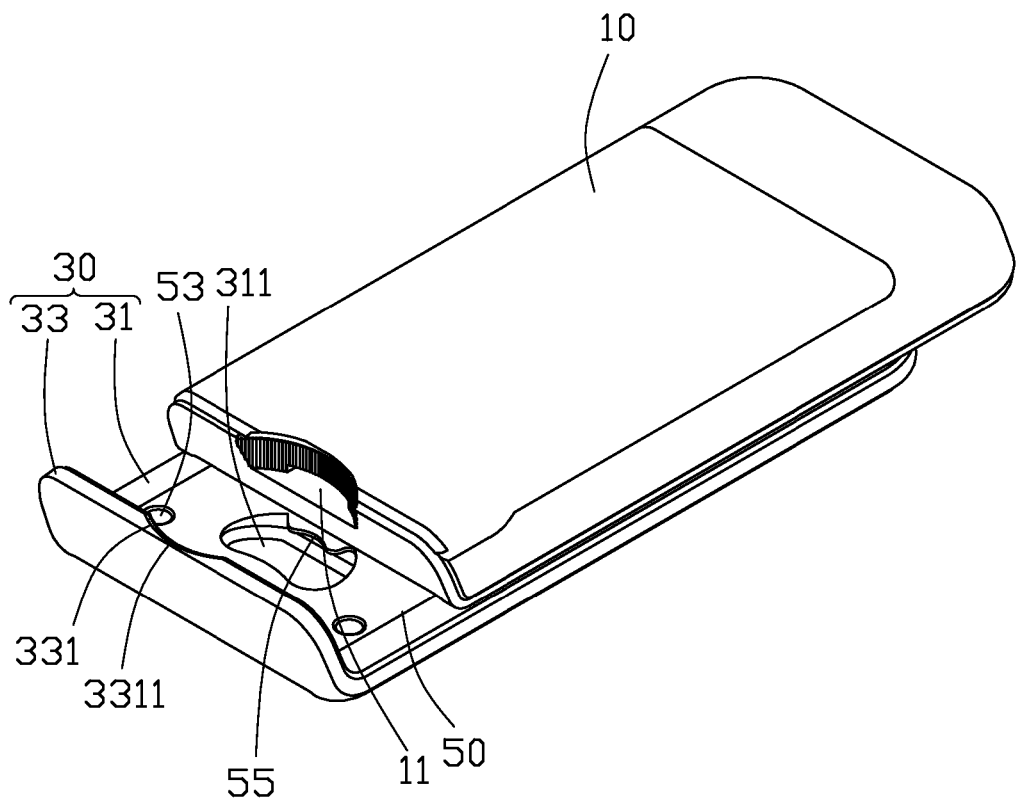
FIG. 4 is another isometric view of a sliding-type portable electronic device in an opened position.
Figure 5:
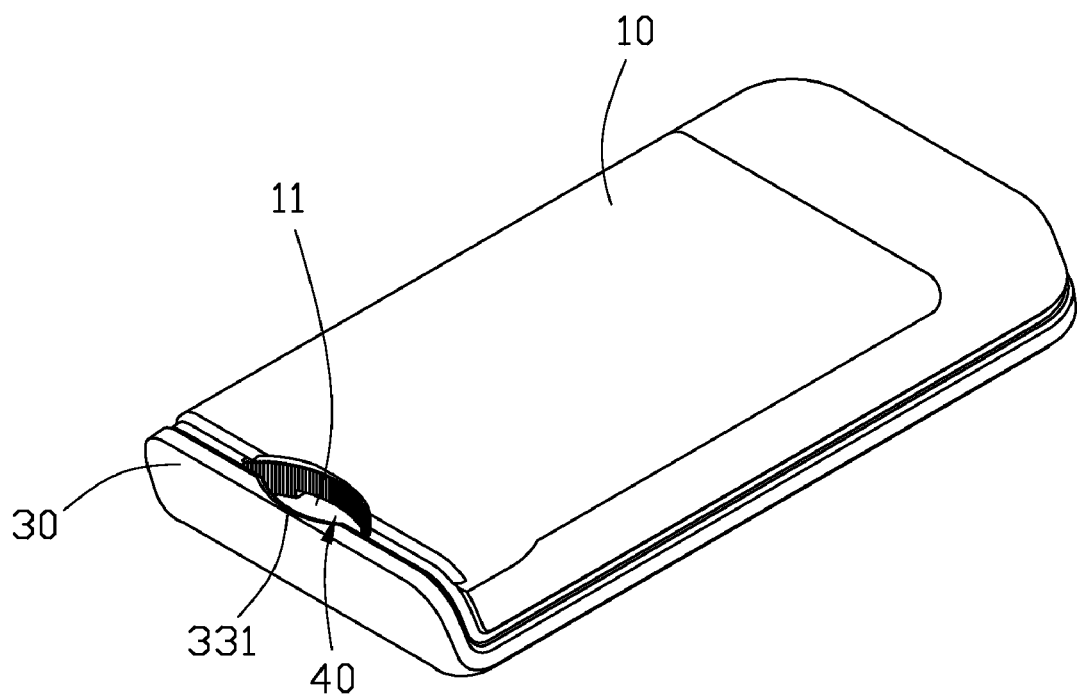
FIG. 5 is similar to FIG. 4, but in a closed position.

FIGS. 4 and 5 show opened and closed positions of the sliding-type portable electronic device 100. Referring to FIG. 4, in the opened position, the cover member 30 is slid a certain distance relative to the housing member 10 to expose the receiving cavity 311 to the outside. In the opened position a pry type bottle cap can be removed from a bottle by inserting an edge of the bottle cap into the receiving cavity 331, and latching the edge in the latching hole 51 by the first latching wall 511 and the second latching wall 513. Then either or both the bottle and the sliding-type portable electronic device 100 moved relative to the other to pry the bottle cap from the bottle.

Referring to FIG. 5, in the closed position, the cover member 30 covers the receiving cavity 311 and abuts the extension plate 33. The second latching recess 331 and the first latching recess 11 cooperatively enclose a latching space 40 therebetween. To remove screw type bottle cap from a bottle, the cover member 30 is slid relative to the housing member 10 open up the latching space 40 enough to receive the top of the bottle cap therein. Then the cover member 30 is slid back toward closed position tightly capturing the bottle cap between the first protruding ribs 1131 and the second protruding ribs 3311. While manually keeping the bottle cap tightly captured, either or both the electronic device 100 and the bottle can be rotated oppositely in the directions required to unscrew the bottle cap until loosening or removal of the bottle cap is achieved.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sliding-type portable electronic device for opening bottle covers of bottles, comprising:
  a housing member defining a first latching recess; and
  a cover member slidably attached to the housing member, and defining a second latching recess facing the first latching recess, the second latching recess and the first latching recess enclosing an adjustable latching space configured for latching the bottle covers during opening of the bottle covers;
  wherein the first latching recess comprises a sidewall, and the sidewall defines a slot inside the cover member;
  wherein the first latching recess faces and aligns with the second latching recess, the sidewall has a plurality of first protruding ribs formed thereon, the second latching recess comprises a plurality of second protruding ribs facing and aligning with the first protruding ribs.

2. The sliding-type portable electronic device as claimed in claim 1, further comprising a bottle opener member secured to the cover member.

3. The sliding-type portable electronic device as claimed in claim 2, wherein the cover member comprises a base plate, the base plate defines a receiving cavity, the bottle opener member defines a latching hole aligning above the receiving cavity.

4. The sliding-type portable electronic device as claimed in claim 2, wherein the first latching recess comprises a bottom wall, the sidewall perpendicularly connecting the bottom wall.

5. The sliding-type portable electronic device as claimed in claim 3, wherein the bottle opener member comprises a first latching wall and a second latching wall connecting the first latching wall, the first latching wall and the second latching wall cooperatively enclose the latching hole.

6. The sliding-type portable electronic device as claimed in claim 5, wherein the bottle opener member further defines a plurality of fixing holes configured for facilitating fixing of the bottle opener member to the base plate.

7. A sliding-type portable electronic device for opening bottle covers of bottles, comprising:
  a housing member defining a first latching recess; and
  a cover member slidably attached to the housing member and comprising a base plate and an extension plate connecting aslant with the base plate, the extension plate defining a second latching recess corresponding to the first latching recess to enclose a latching space therebetween, the latching space being adjustable to latch a bottle cover therein so that the bottle cover can be removed away from its bottle by rotating either the bottle or the sliding-type portable electronic device;
  wherein the first latching recess comprises a sidewall, and the sidewall defines a slot inside the cover member;
  wherein the first latching recess faces and aligns with the second latching recess, the sidewall has a plurality of first protruding ribs formed thereon, the second latching recess comprises a plurality of second protruding ribs facing and aligning with the first protruding ribs.

8. The sliding-type portable electronic device as claimed in claim 7, further comprising a bottle opener member secured to the cover member.

9. The sliding-type portable electronic device as claimed in claim 8, wherein the base plate defines a receiving cavity, the bottle opener member defines a latching hole aligning above the receiving cavity.

10. The sliding-type portable electronic device as claimed in claim 8, wherein the first latching recess comprises a bottom wall, the sidewall perpendicularly connecting the bottom wall.

11. The sliding-type portable electronic device as claimed in claim 9, wherein the bottle opener member comprises a first latching wall and a second latching wall connecting the first latching wall, the first latching wall and the second latching wall cooperatively enclose the latching hole.

12. The sliding-type portable electronic device as claimed in claim 11, wherein the bottle opener member further defines a plurality of fixing holes configured for facilitating fixing of the bottle opener member to the base plate.

\* \* \* \* \*